United States Patent [19]

Allen et al.

[11] Patent Number: 5,539,918
[45] Date of Patent: Jul. 23, 1996

[54] EXTENSION OF DATA BLOCK CAPABILITY IN A DATA TRANSFER CHANNEL

[75] Inventors: Vincent K. Allen; Scott M. Fry; Warren B. Harding; Robert G. Long; Jerry W. Pence, all of Tucson, Ariz.; Wayne E. Rhoten, Morgan Hill, Calif.; Richard A. Ripberger, Tucson, Ariz.

[73] Assignee: International Business Machines Corporation, Armonk, N.Y.

[21] Appl. No.: 451,878

[22] Filed: May 26, 1995

Related U.S. Application Data

[62] Division of Ser. No. 998,971, Dec. 30, 1992, Pat. No. 5,517,670.

[51] Int. Cl.⁶ .................................................. G06F 13/00
[52] U.S. Cl. .................. 395/853; 395/850; 364/238.3; 364/DIG. 1; 360/48
[58] Field of Search ............................ 395/225, 500, 395/850, 853, 821, 825, 842, 885, 580; 360/48; 368/48

[56] References Cited

U.S. PATENT DOCUMENTS

| | | | |
|---|---|---|---|
| 4,445,176 | 4/1984 | Burk et al. | 395/275 |
| 4,843,544 | 6/1989 | DuLac | 364/200 |
| 5,016,160 | 5/1991 | Lambeth et al. | 364/200 |
| 5,023,829 | 6/1991 | Shibata | 364/900 |
| 5,101,477 | 3/1992 | Casper et al. | 395/250 |
| 5,260,964 | 4/1993 | Brunk | 395/500 |
| 5,388,013 | 2/1995 | Nakamura | 360/48 |
| 5,404,504 | 4/1995 | Byers et al. | 395/575 |
| 5,414,570 | 5/1995 | Fry et al. | 360/48 |
| 5,414,814 | 5/1995 | McKim | 395/275 |
| 5,420,727 | 5/1995 | Basham | 360/48 |

FOREIGN PATENT DOCUMENTS

| | | |
|---|---|---|
| 54-114134 | 9/1979 | Japan . |
| 55-74624 | 6/1980 | Japan . |
| 57-43221 | 3/1982 | Japan . |
| 1-302456 | 12/1989 | Japan . |

OTHER PUBLICATIONS

"Method For Transferring Large Amounts of Data to Streaming Tapes" by Reser; IBM Tech. Discl. Bltn.; vol. 31 No. 6; Nov. 1988; pp. 341–342.

"Computer Architecture and Parallel Processing"; Hwang et al; Memory & Input–Output Subsystems; McGraw Hill, New York; 1984; pp. 118–141.

*Primary Examiner*—Christopher B. Shin
*Attorney, Agent, or Firm*—Baker, Maxham, Jester & Meador

[57] ABSTRACT

An adaptive data transfer channel providing means for a data management access method (AM) to define the channel subsystem data block transfer size and to transfer an extended data block (EDB) by a single channel transfer command to avoid repeated channel command word (CCW) command decode and status presentation operations. The adaptive scheme of this invention is transparent to the user and downwardly compatible with existing data record storage formats because it is independent of the user application program. The host software in the central processing complex (CPC) tests the peripheral data storage device (PDSD) to ensure compatibility with the EDB CCWs before selecting the channel program (CP) to be used for data block transfer in the subchannel. In the EDB format, the PDSD microcode permits the accumulation of logical data blocks (LDBs) from storage to form a single large EDB before transfer to the CPC responsive to a single transfer command. Conversely, the CPC can transfer a single EDB to the PDSD where it is parsed to form data records in an existing data record storage format, thus ensuring complete downward compatibility with existing data record storage formats.

9 Claims, 11 Drawing Sheets

4.3 MB/SEC RATE 5.8 MB/SEC RATE 7.1 MB/SEC RATE

CF – COMMAND FLAGS
MW – MINIMUM-WRITE-BLOCK LENGTH
XW – MAXIMUM-WRITE-BLOCK LENGTH
MEL – MAXIMUM EDB LENGTH

ALL CHARACTERISTICS ARE STORED IN PDSD CONTROLLER

EXTENSION OF DATA BLOCK CAPABILITY IN A DATA TRANSFER CHANNEL

CROSS-REFERENCES TO RELATED APPLICATIONS

This application is a division of application Ser. No. 07/998,971, filed Dec. 30, 1992, now patented U.S. Pat. No. 5,517,670.

BACKGROUND OF THE INVENTION

1. Field of the Invention

This invention relates generally to systems for transferring logical data between an application program running in a central processing complex (CPC) and a peripheral data storage device (PDSD) and, more specifically, to such a system that adapts the block size of such transfers to optimize transfer efficiency responsive to PDSD capability without modifying the predetermined record storage formats and without changing the existing application program.

2. Discussion of the Related Art

A glossary of the acronyms used throughout this discussion is provided herein below. The performance of a data processing computer system can be limited by tasks requiring intensive computations (compute-bound jobs) or tasks requiring intensive data transfers between processor and storage (I/O-bound jobs). Most peripheral data storage devices (PDSDs) employ electromechanical devices and thereby limit data transfer rates well below central processing complex (CPC) capacity. Accordingly, it is a well-known practice in the art to separate the I/O data transfer function from the central processing unit (CPU) within the CPC and relegate it to a independent I/O channel subsystem (CS). Similarly, data management access methods (AMs) and an I/O control program (IOCP) are used to separate the control of I/O operations from an application program.

The CS known in the art provides a generalized interface to permit the application programs within CPC to communicate with any attached PDSD through AM requests to the IOCP. The IOCP controls PDSD operation by initiating the execution of special channel program (CP) instructions. A CS typically contains one or more channels that provide such an interface, which is denominated a "channel path". IOCP communication with any I/O device such as a PDSD is directed through a logical facility within the CS denominated a "subchannel".

The channel path is the logical or physical interconnection of a channel to the connected PDSDs. A CS has one channel path associated with each installed channel. The application program in CPC typically initiates communication with the CS through execution of logical read and write requests to the AM, which may organize the data into blocks to improve PDSD efficiency. Conversely, the CS may initiate communication with the IOCP in CPC through the signalling of an I/O interrupt. The IOCP then signals the application program of read/write completion when appropriate. Following execution of an I/O instruction to initiate an I/O operation, the CS assumes all subsequent responsibility for the execution of an associated CP. In general, the CPC continues processing other instructions while the CS processes the CP. When the CP processing is terminated, the CS then interrupts the IOCP in CPC to signal I/O completion and awaits further I/O instructions. Typically, the IOCP then proceeds to the next I/O instruction for which an AM request is pending.

It is a well-known practice in the art for the AM in CPC to create a CP within the CS in response to application requests. Such a CP is executed by the CS to effect a specified data transfer between the CPC and a selected peripheral device such as a PDSD. The CP usually consists of one or more channel-command words (CCWs), each containing a single transfer command (TC) code for execution by the peripheral device. The IBM Enterprise Systems Architecture/390 (ESA/390) operating system includes a typical example of such an I/O architecture, which can be fully appreciated with reference to ESA/390 Principles of Operation, International Business Machine Corporation, Armonk, N.Y., Document No. SA22-7201. Other data transfer architectures are briefly discussed in "Computer Architecture and Parallel Processing", edited by Kai Hwang, et al, McGraw Hill, New York (1984), pp. 118–140.

There has long been a clearly felt need in the art for improved data transfer efficiency between CPC and PDSD. Speed differences of many orders of magnitude still exist between CPC and PDSD. The art is replete with efforts to accomplish such improvements. Much of this effort concentrates on the design and execution of the CP. For instance, useful CCW data and command chaining schemes for optimizing CPs are disclosed in Japanese Patents JP 01-302456, JP 55-74624, and JP 54-114134 and in U.S. Pat. No. 4,843,544.

J. K. Reser ("Method For Transferring Large Amounts of Data to Streaming Tapes", IBM Technical Disclosure Bulletin, Vol. 31, No. 6, Nov. 1988, pp. 341–342) suggests an enhancement to the Virtual Machine system that permits the dynamic creation of CCW strings for transferring data to and from streaming tape drives. Essentially, his technique involves the accumulation of CCWs to form a "dynamic" CP by adding CCWs until a threshold is met, whereupon the growing CID is then closed and executed. Similarly, in U.S. Pat. No. 5,016,160, Shawn M. Lambeth, et al teach a computer system having a system memory data transfer scheme that accumulates CCWs having contiguous indirect data address word (IDAW) to reduce direct memory access (DMA) overhead. Thus, in effect, Lambeth et al also teach a system for adapting a CP by accumulating various CCWs responsive to channel efficiency considerations. Also, in U.S. Pat. No. 5,023,829, Yoshikazu Shibata discloses a data transfer system that adapts each CCW to the available PDSD buffer space. Shibata's method applies to write operations only. Although his technique permits the CPC to dynamically adapt the CP to accommodate different direct access storage device (DASD) data buffer sizes by dividing the data transfer requirement into more or fewer CCWs of varying extent, Shibata neither considers or suggests a method for adapting the CP to optimize channel efficiency in both directions.

Other efforts are focused on improving the particular CCW architectures available for building the CID. For instance, in U.S. Pat. No. 5,101,477, Daniel F. Casper, et al disclose a data transfer scheme for transferring data between a buffer and storage device within a PDSD. Casper et al teach a PDSD buffer/storage scheme but do not suggest how it may be exploited, through the careful design of CCWs, to improve the efficiency of PDSD data transfers. Similarly, in U.S. Pat. No. 4,843,544, Keith B. DuLac, et al teach a method of operating a finite state machine to control the storage operation between buffer and disk in a PDSD but do not suggest whether their method could also support new and useful CCW architectures.

Unfortunately, in a data processing system exemplified by the IBM ESA/390, the quantity of data transferable by a single CCW is limited in accordance with the data block count field within the CCW. For the ESA/390, the CCW count field is 16-bits, which effectively limits the size of a logical data block (LDB) transferred by a single CCW to 64 kilobytes (kB). This in turn limits subchannel performance because a significant amount of time is required in the PDSD for the "command decode" procedure at the beginning of each CCW and for the "status presentation" procedure at the completion of each CCW.

Such an artificial performance limitation arises mainly from the host software and hardware specifications. Such specifications could be easily changed to, say, increase the count field size in each CCW, but such changes would merely create a "new" operating system incompatible with all existing operating systems and software. The "new" system would thus be useless for improving an existing installed data processing base. Although many practitioners have proposed methods for improving CP efficiencies involving both software and hardware schemes, none have considered or suggested fully downward-compatible methods for increasing the transfer efficiency of single CCWs in an operating system such as the ESA/390. Indeed, most merely propose methods for adapting the CP by varying the numbers of individual CCWs. Until now, an adaptive, user-transparent method for reducing CCW "command decode" and "status presentation" overhead for large data transfers was unknown in the art. The related unresolved problems and deficiencies are clearly felt in the art and are solved by this invention in the manner described below.

SUMMARY OF THE INVENTION

This invention solves the command interpretation overhead problem for large data transfers through a method whereby the data management access method (AM) in the central processing complex (CPC) can determine optimum block transfer size and specify the number of blocks and bytes of data to be transferred by a single transfer command (TC) in a first channel control word (CCW) followed by the data chained CCW transfer of an extended data block (EDB) up to whatever host space size limit exists without further CCW command decode or status presentation procedures.

It is an object of this invention to provide an alternative multi-block transfer capability without changing the predetermined data record format used in the CPC or in the peripheral data storage device (PDSD). It is an advantage of the method of this invention that a large data transfer performance improvement is gained without modification of the existing hardware or storage protocol. It is another advantage of this invention that the switching between existing logical data block (LDB) CCWs and the EDB CCWs of this invention is entirely transparent to the application program in the central processor and to the PDSD data storage medium. The application program is not prevented from bypassing the AM and using this invention directly.

It is another object of this invention to provide a method for multiple block data transfers that results in data storage tapes (or other media) that are entirely compatible with existing PDSD and channel system (CS) protocols. It is a feature of this invention that the media record format is unchanged so that data from existing tapes can be transferred in accordance with either the existing LDB transfer method or the EDB transfer method of this invention. This invention also provides for variable LDB length.

In the preferred embodiment of this invention, these objects are met through introduction of changes in the AM and through new CCWs, which provide for a Write Extended (WRTE) command and a Read Forward Extended (RDFE) command. In addition to the new transfer commands (TCs), the preferred embodiment of the method of this invention introduces an EDB data structure that contains one or more self-described LDBs. The EDB structure includes an extended block header (EBH) that defines the length of both EBH and EDB as well as a list of LDB descriptors that specify the lengths and types of LDBs to be included in the single EDB.

A sense command, denominated the Read Device Characteristics (RDC) command in the preferred embodiment of this invention, allows the channel program (CP) to obtain specific compatibility information from the PDSD that is then used to select which of two alternate types of CPs it is to construct for the required data transfer operation. The first alternate CP is limited to the CCWs known in the art (e.g., read, write) for single LDB transfers. The second alternate CP includes the CCWs of this invention (e.g., RDFE, WRTE) for EDB transfers involving a plurality of LDBs. The AM modification of this invention uses a new version of the "mode set" command to establish the appropriate PDSD operating characteristics.

The WRTE command of this invention causes data described by one EDB and including one or more LDBs to be transferred from the CS to the PDSD. The RDFE command similarly operates to transfer one EDB from PDSD to CS memory. Either RDFE or WRTE command is a single TC and requires only a single command decode procedure in PDSD or CS before execution. Only a single status presentation procedure is necessary following completion of the data-chained EDB transfer. In the preferred embodiment of this invention, the EDB transferred by a single RDFE or WRTE command is limited to 4 GB and up to 16,000 LDBs. It may be further limited by PDSD memory size or other features. This EDB is transferred as a plurality of data-chained CCWs that incur no individual decode/status procedure overhead.

The method of this invention permits existing data transfer systems to be upgraded to incorporate these advantages and features merely by changing AM software and PDSD microcode. No changes are needed in application programs or data medium record formats. The method of this invention can reduce data transfer times by as much as 50% over the existing art in selected implementations.

The foregoing, together with other objects features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Glossary of Acronyms

The following acronyms are used herein as defined below:

```
AM—access method
CBC—checking-block code
CC—chain-command
CCW—channel-command word
CD—chain-data
CP—channel program
CPC—central processing complex
CPU—central processing unit
CS—channel subsystem
DASD—direct access storage device
DCS—device characteristics signal
DMA—direct memory access
EBH—extended-block header
EBL—extended-block length
EDB—extended data block
ESA/390—Enterprise Systems Architecture/390
HL—header length
HPL—header preamble length
IDA—indirect-data-address
IDAW—indirect-data-address word
IOCP—I/O control program
I/O—input/output
kB—kilobyte
LDB—logical data block
ORB—operation-request block
PCI—program-controlled-interrupt
PDSD—peripheral data storage device
RDC—read device characteristics
RDFE—read forward extended
S—suspend
SLI—suppress-length-indication
TC—transfer command
TIC—transfer-in-channel
WRTE—write extended
```

Description of A Related Data Processing System Architecture

Figure 1:
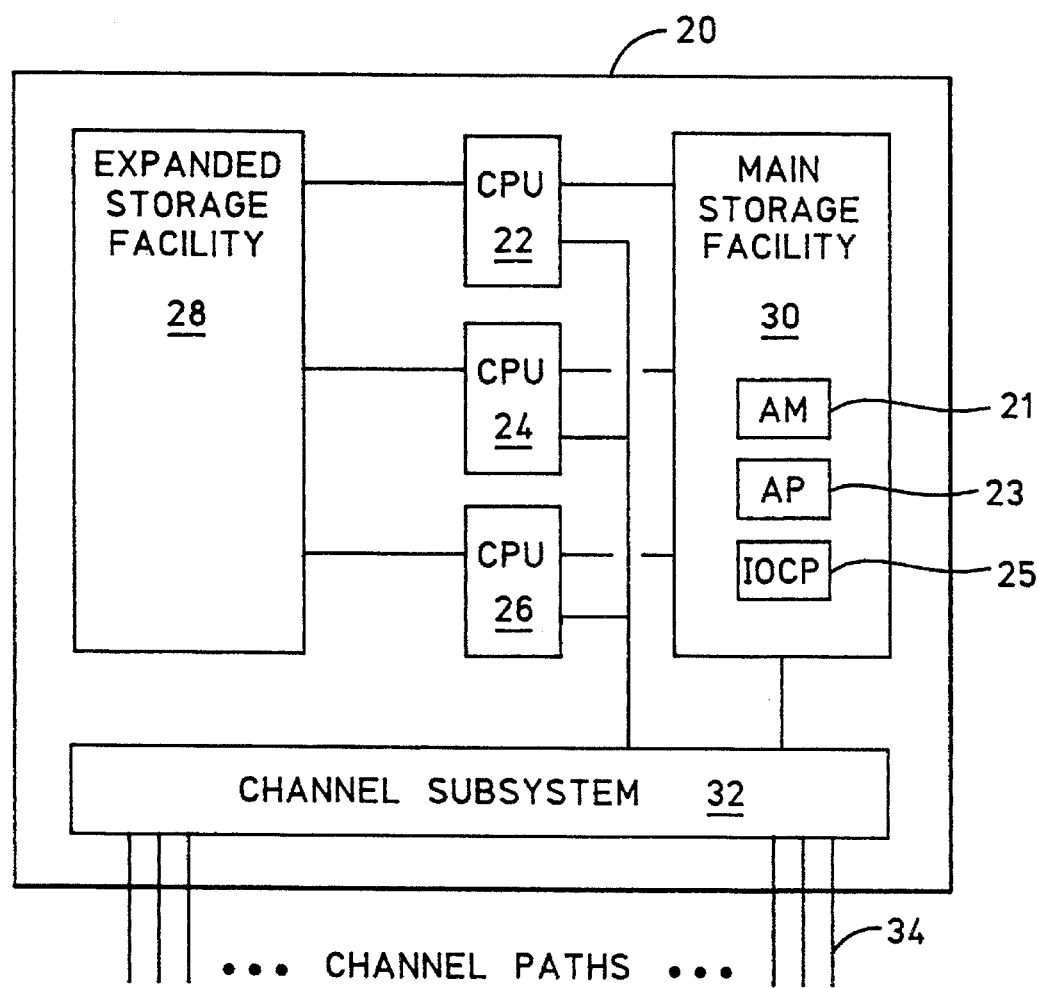
FIG. 1 is a schematic representation of the IBM ESA/390 central processing complex (CPC) from the prior art.

This invention is particularly useful when applied to existing data processing system architectures such as the Enterprise Systems Architecture/390 (ESA/390) architecture developed by International Business Machines Corporation. FIG. 1 shows the ESA/390 central processing complex (CPC) architecture in block diagram form. The CPC 20 consists of the software and hardware facilities required to implement a host computer system that conforms to the ESA/390 system specification, including the access method (AM) 21, the application program 23 and the I/O control program (IOCP) 25. Depending on the CPC type and model, one or more central processing units (CPUs) may be configured in CPC 20 of FIG. 1. For instance, the CPUs 22, 24 and 26 are interconnected with an expanded storage facility 28 and a main storage facility 30. CPC 20 also contains a single channel subsystem (CS) 32 that allows CPC 20 to communicate with input/output (I/O) devices over a plurality of channel paths exemplified by a channel path 34.

IOCP 25 receives read/write requests from application program 23 and prepares channel programs (CPs) to control operation of CS 32. AM 21 provides a generalized interface to application program 23 and communicates with any attached I/O devices (not shown) through execution of the special CP instructions. CS 32 contains one or more channels (not shown) that provide an interface to attached I/O devices along a channel path such as channel path 34. Each I/O device in the configuration is associated with a single subchannel (not shown) within CS 32. A subchannel is designated by a sub channel number that is used as a parameter in the CP instructions. Any I/O operations requested by the AM 21 for an I/O device are directed to the associated subchannel by number. Each subchannel may be associated with up to eight channel paths. Each channel path is assigned a channel-path identifier that uniquely identifies a single physical channel interface. AM 21 can control or limit which channel paths in the subchannel may be used by CS 32 during an I/O operation through its interface with IOCP 25. CS 32 selects a channel path based on (a) information provided by AM 21, (b) IOCP 25, (c) configuration information stored in CS 32, and (d) path management rules specified by the ESA/390 architecture. Typically, application program 23 is unaware of CPs, channel paths, I/O devices, and device characteristics, all managed by AM 21 and IOCP 25.

Upon execution of an I/O instruction that initiates a data transfer operation, CS 32 assumes responsibility for the execution of the associated channel program (CP). In general, the affected CPU is permitted to continue processing other instructions while CS 32 processes the CP instructions. Following completion or termination of the CP, CS 32 sends an interruption request to the IOCP 25 signalling completion of the data transfer operation.

Figure 2:
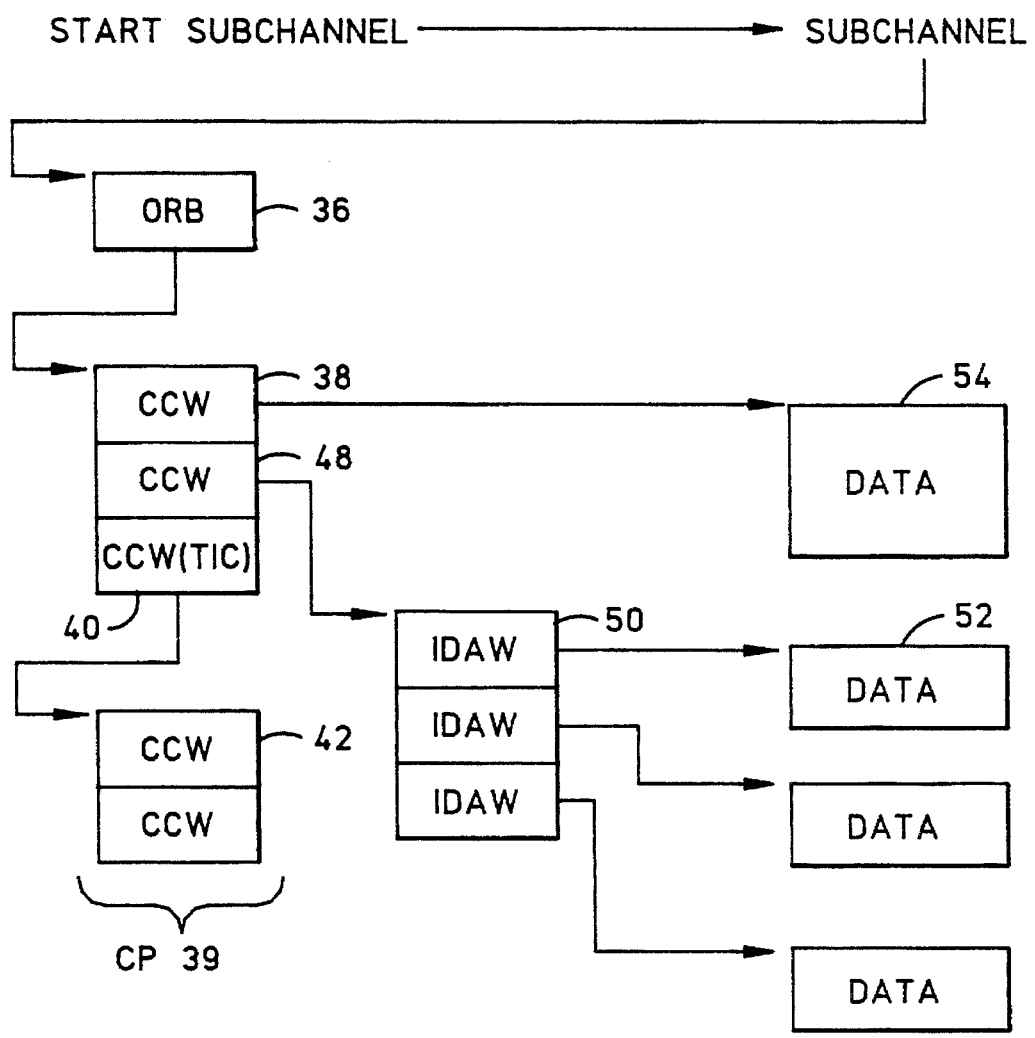
FIG. 2 illustrates the relationship of the subchannel data structures used in data transfer operations by the CPC from FIG. 1.

IOCP 25 initiates an I/O operation by executing a Start I/O instruction (FIG. 2). The start I/O instruction identifies a CP that CS 32 is to execute for a specified peripheral data storage device (PDSD). The CP consists of one or more channel-command words (CCWs), each containing a transfer command (TC) code that may be issued to the target PDSD for execution.

Following issue of the Start I/O command, CS 32 is signalled to asynchronously perform the start subchannel function for the target PDSD. This start subchannel instruction (FIG. 2) specifies the identification of a subchannel (not shown), which herein is defined as the combination of physical and logical elements necessary to perform the data transfer function requested by application program 23, and specifies an operation-request block (ORB) 36.

FIG. 2 shows the relationship of the data structures used in executing data transfer in a subchannel. ORB 36 identifies the CP to be executed. Once CS 32 has accepted the initiative to asynchronously perform the requested start subchannel function, the execution parameters contained in ORB 36 are transferred to the subchannel. These execution parameters include the CP address, which specifies the absolute address of the first CCW 38 in the CP 39 to be executed.

CP 39 is composed of a series of one or more CCWs (FIG. 2). The CCWs are stored in a block of contiguous storage locations, except where the CCW is a transfer-in-channel (TIC) CCW. The CCW (TIC) 40 in FIG. 2 provides the absolute address of the next CCW 42 of CP 39 when CCW 42 is stored in a different block of contiguous storage. All CCWs in CP 39 are in the format specified by the format control elements of ORB 36. An ESA/390 CCW embodiment is 8 bytes long, and is shown in FIG. 3.

Figure 3:
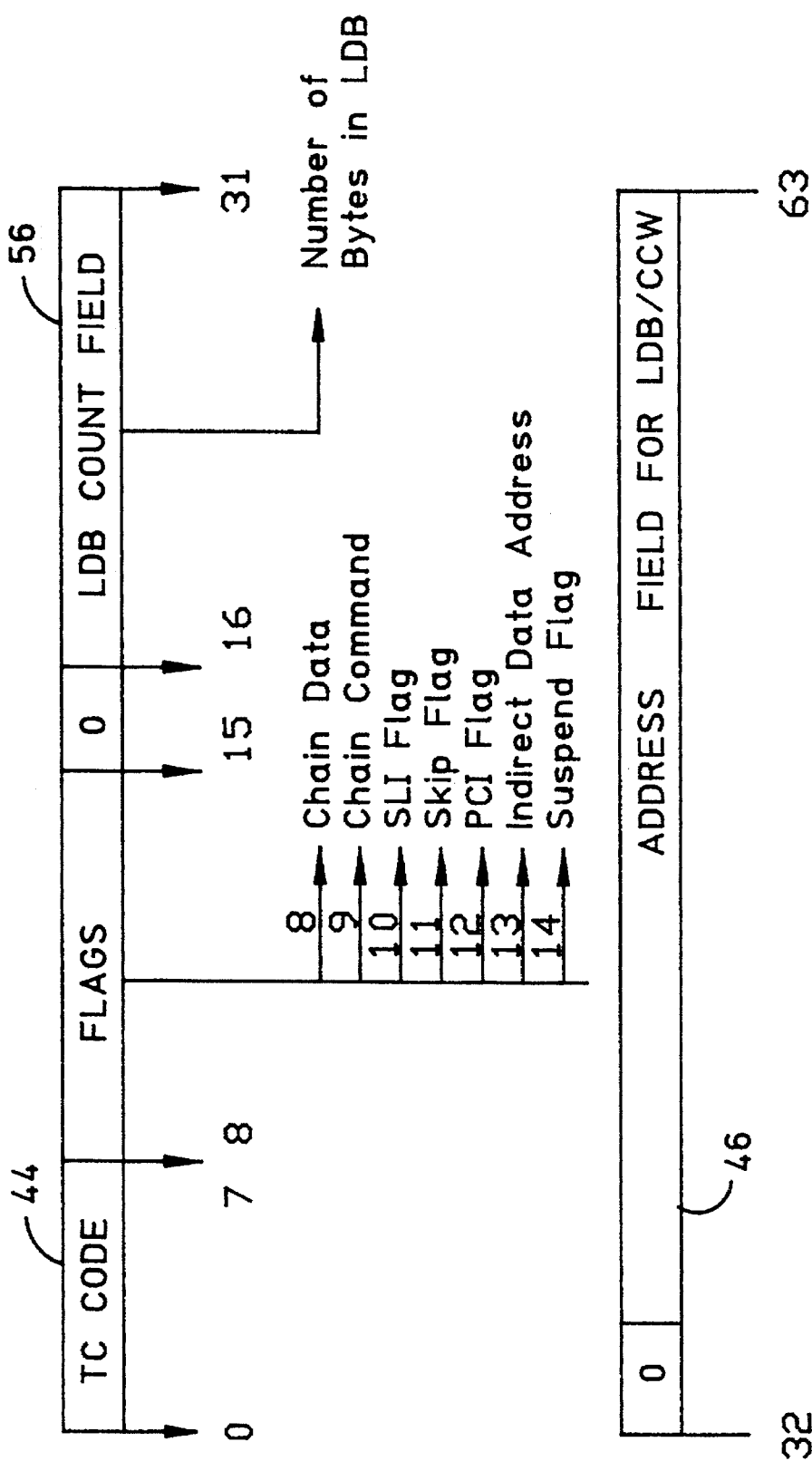
FIG. 3 is a schematic representation of the "format-1" channel control word (CCW) from FIG. 2.

FIG. 3 shows an eight-byte ESA/390 "format-1" CCW convention, which differs slightly from the ESA/390 "format-0" CCW convention (not shown). The CCW fields in FIG. 3 are defined as follows:

The transfer command (TC) code field 44: Bits 0–7 specify the operation to be performed by CS 32. For a TIC command, only TC code field 44 and the address field 46 have meaning. When a CCW is fetched as a result of data chaining, TC code field 44 is ignored unless it specifies a TIC command.

Address field 46 for data: For a command other than TIC, address field 46 specifies an absolute address of the first byte of the LDB associated with the CCW if the IDA flag (bit 13) is zero. Address field 46 specifies instead the absolute address of the first indirect data address word (IDAW) associated with the CCW if the IDA flag is one. Address field 46 is ignored if the LDB count field 56 is zero. For a TIC command, address field 46 specifies the absolute address of the next CCW in the CP. For instance, in FIG. 2, CCW 48 sets bit 13 to one and refers to the IDAW 50, which indirectly refers to data location 52. Conversely, CCW 38 sets bit 13 to zero and refers directly to data location 54. Also, the CCW 40 refers to CCW 42 instead of a data location because it is a TIC CCW.

LDB count field 56: Bits 16–31 specify the number of bytes of data that are to be transferred by this CCW.

Chain-Data (CD) flag: Bit 8 specifies chaining of data. It indicates that TC code 44 in the next CCW in the CP (other than a TIC CCW) is to be ignored by the CS and that address field 46 defines another storage area to be chained with the current I/O operation. The current I/O operation is determined by TC code field 44 in the most recent non-data-chained CCW. More than one CCW can be data-chained and TIC CCWs may occur between data-chained CCWs. When a TIC CCW is encountered, data-chaining to the next CCW is implied and bit 8 is not used to determined data chaining in a TIC. When chain-data is indicated, the chain-command flag (bit 9) and the SLI flag (bit 10) are ignored.

Chain-Command (CC) flag: When the CD and suspend (S) flags are both zeros, bit 9 specifies chaining of commands. It causes the operation specified by TC code 44 in the next CCW to be initiated upon normal completion of the current I/O operation. More than one CCW can be command-chained together and TIC CCWs may occur between command-chained CCWs. When a TIC CCW is encountered, command-chaining to the next CCW is implied and bit 9 is not used to determine command-chaining in a TIC.

Suppress-Length-Indication (SLI) flag: Bit 10 specifies that the incorrect-length indication is suppressed. When both the CC and SLI flags (bits 9 and 10) are set and the CD flag (bit 8) is zero, command-chaining takes place regardless of an incorrect-length condition on the current CCW.

Skip (SKIP) flag: Bit 11 specifies that data transfer to storage is to be suppressed during an input operation. Data received from a PDSD under control of this flag is accepted, checked and discarded.

Program-Controlled-Interrupt (PCI) flag: Bit 12 sets program-controlled interruption in the subchannel when the flagged CCW becomes the currently active CCW during execution of the CP.

Indirect-Data-Address (IDA) flag: Bit 13 indicates that indirect-data addressing is in effect for this CCW and that address field 46 holds the absolute address of the first of a list of IDAWs stored in a contiguous block of storage.

Suspend (S) flag: Bit 14 specifies CP suspension.

Figure 9:
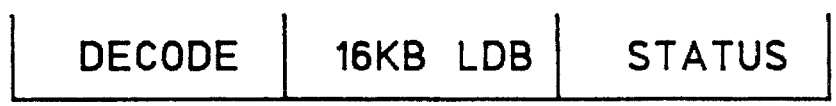
FIG. 9 illustrates the effect of CCW overhead on logical data block (LDB) transfers made by the methods of the prior art.
Figure 9:
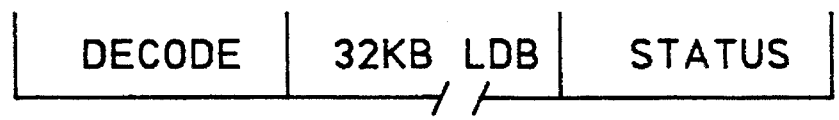
Figure 9:
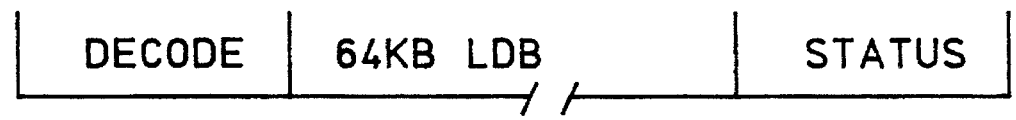

It will be appreciated from the above discussion that every CCW transferred over a channel path by CP 39 must be decoded, executed and its status reported back to CS 32. FIG. 9 illustrates the effect of this decode and status operation overhead on the transfers of LDBs of various size, assuming a one-millisecond operation delay at each end and a 9 MB/sec transfer rate. The transfer of each LDB is preceded by a one millisecond command decode procedure and followed by a one-millisecond status reporting operation. Because LDB count field 56 (FIG. 3) is limited to 16 bits, the largest LDB that can be transferred by a single CCW is one less than 64 kB.

Command-chaining can be used to transfer more than one LDB in the same CP but offers no improvement in channel efficiency because of the additional overhead associated with command decode and status presentation for each chained CCW.

The Related Channel Program Execution Process

CS 32 processes CP 39 (FIG. 2) by fetching the first CCW 38 and performing the required TC activity. Completion of CCW 38 causes CS 32 to fetch and process the next CCW 48 until all CCWs in CP 39 are processed. When CS 32 processes a CCW, it examines TC code 44 (FIG. 3) to determine the proper TC operation. If the CCW is a TIC command, CS 32 fetches the next CCW from the absolute address specified in address field 46. For TC codes other than TIC, CS 32 uses the CC and CD flags (bits 8–9) to determine whether there is another CCW in CP 39 located in the next absolute address following the present CCW. That is, if the CC flag (bit 9) is not set, there are no more CCWs awaiting execution.

When first CCW 38 of CP 39 is processed or when a CCW is processed as a result of command-chaining, CS 32 causes the TC in the CCW to be issued to the PDSD. When a CCW other than TIC is processed as a result of data-chaining, CS 32 does not issue a TC to the PDSD but instead performs additional data transfer for whatever I/O operation is currently in progress at the PDSD. When a CCW causes CS 32 to issue a TC to the PDSD, CS 32 uses an interface protocol appropriate for the attached I/O interface (not shown) to issue the TC. On this attached I/O interface, the PDSD (not shown) perceives as a command chain the string of TCs in the CCW string issued by CS 32 during CP execution. A command-chaining indication is signalled by CS 32 as each CCW following the first TC is issued. When a CCW is issued without the command-chaining indication, the PDSD control unit treats that TC as the beginning of a new command chain. Any subsequent TCs that are issued with command-chaining are considered part of the same command chain.

As each CCW is executed in turn, CS 32 makes certain checks and monitors certain conditions to determine whether to execute the associated TC and whether to continue processing the CP. These activities include the decode/status procedures discussed above, even when no TC is issued. The first CCW in the CP becomes current when it is fetched at the initiation of the start subchannel function before selecting the target PDSD control unit. The remaining CCWs in the CP become current when either command-chaining or data-chaining occurs following the successful completion of an earlier CCW in the CP.

Figure 10:
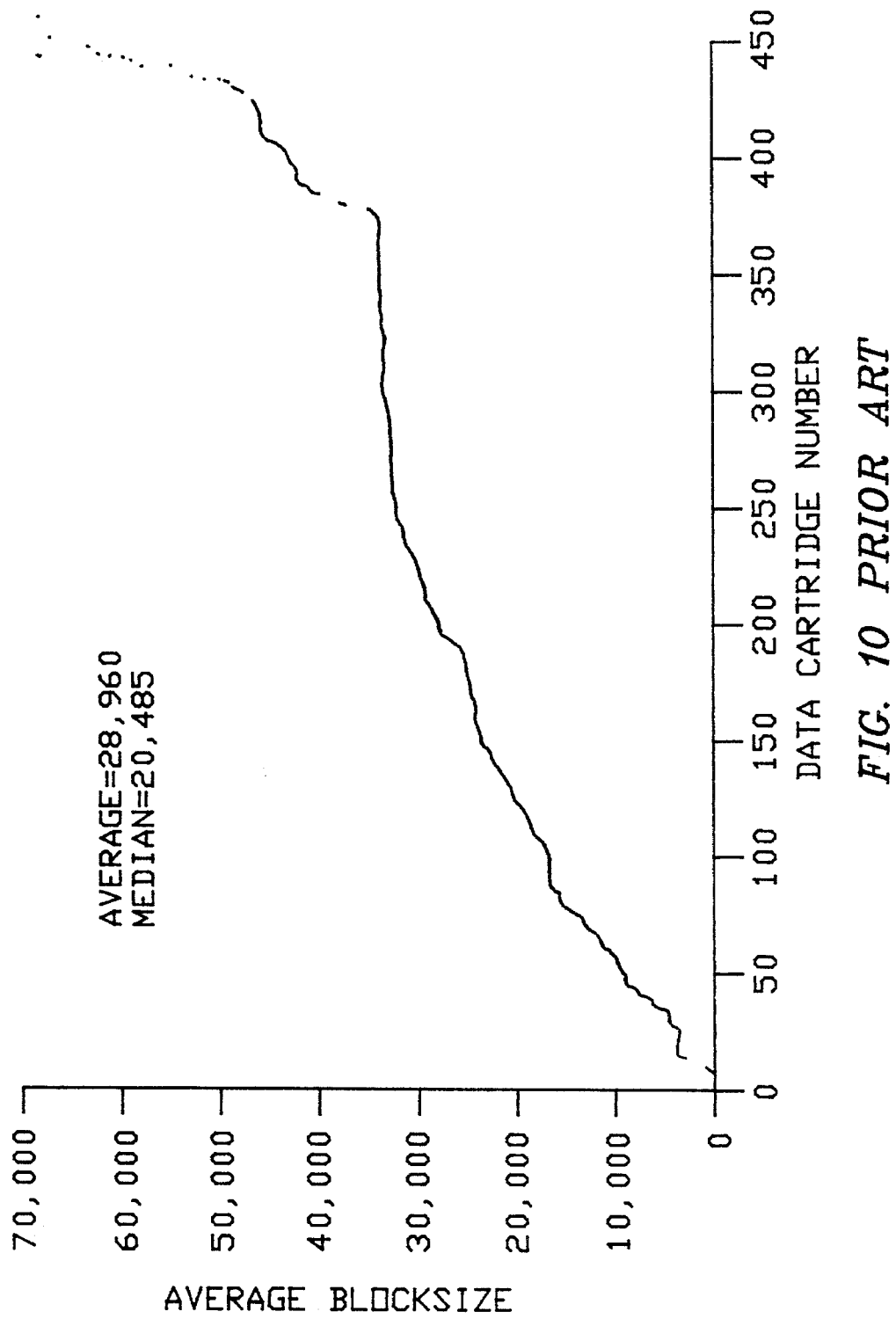
FIG. 10 shows a histogram distribution of average block size measured in 447 typical data cartridges.

FIG. 10 shows the distribution of data blocks found on 447 randomly selected data tape cartridges in a typical ESA/390 system. The inventors discovered that the average LDB was nearly 29 kB in length as was the median LDB. The sequential access method (AM) commonly used in the ESA/390 system reserves one bit of count field 56 (FIG. 3), thereby limiting LDB size to 32 kB instead of 64 kB. However, the majority of these LDBs do not exceed even the 32 kB limit imposed by the existing 16-bit CCW count field specification with one reserved bit. FIG. 10 demonstrates that CS 32 is overhead-bound by an LDB size that is generally below the 64 kB limit of the existing count field.

Figure 12:
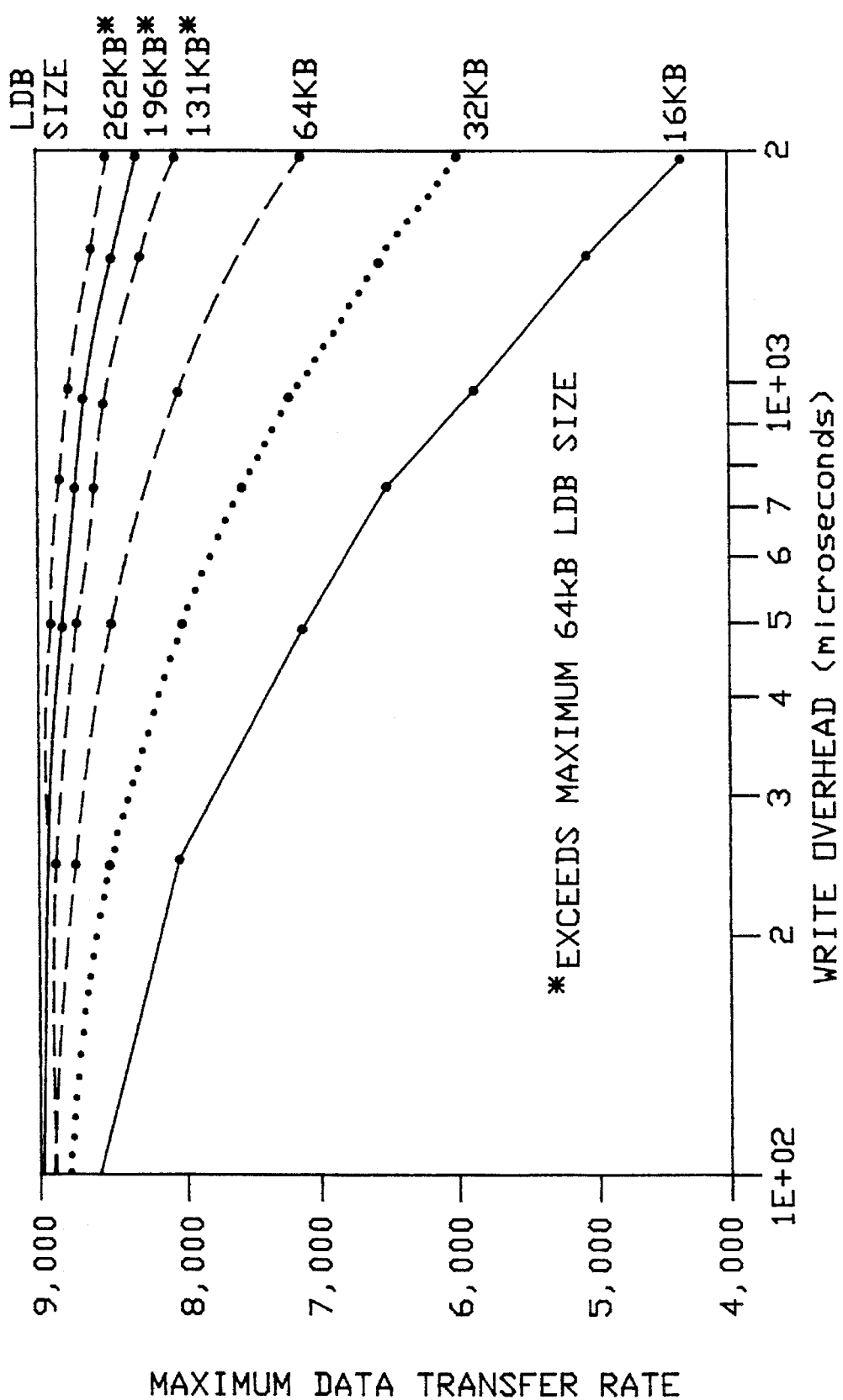
FIG. 12 shows the maximum channel data transfer rate as a function of CCW decoding overhead for EDB block sizes from 16 kB through 262 kB.

FIG. 12 shows the relative advantage of the EDB method of this invention as a function of the write overhead associated with each LDB transfer. Clearly, as LDB size is increased, the maximum data transfer rate becomes less sensitive to the associated block transfer overhead.

Description of The Preferred Extended Data Block (EDB) Architecture Of This Invention The AM modification of this invention uses the "mode set" command (FIG. 8) to establish the appropriate PDSD operating characteristics. The additional mode set options employed by this invention include:

| | |
|---|---|
| Pad Header: | to provide a fixed length header to the AM. |
| Pad Short Block: | to provide a fixed length data field when the data field would otherwise fall short of the requested amount. |
| Indicate Long Block: | to notify the AM when more data is available than anticipated by the AM. |
| Indicate Short Block: | to notify the AM when less data is available than anticipated by the AM. |
| Truncate Long Block: | to instruct the PDSD to truncate data transfer after the requested amount of data has been transferred when more data is available than anticipated by the AM. |

Figure 4:
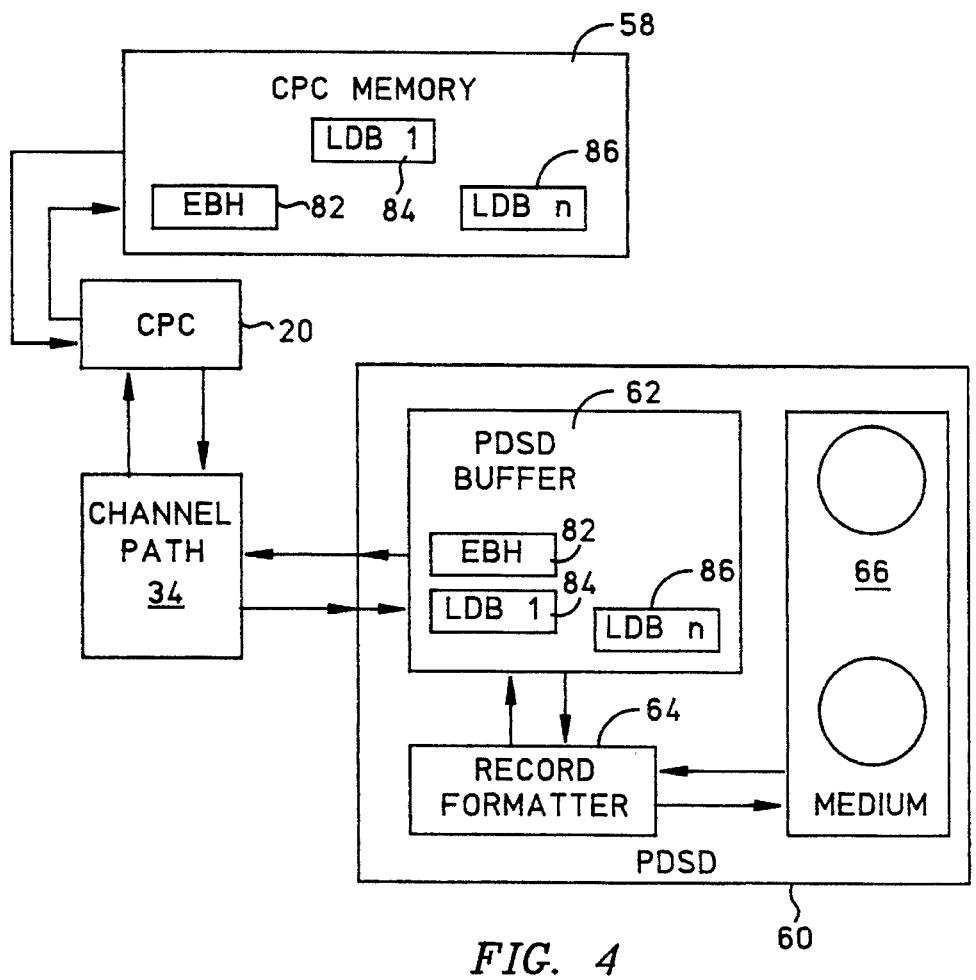
FIG. 4 is a schematic representation of the preferred embodiment of the system of this invention.

This invention also introduces a new extended data block (EDB) architecture that increases the command and data transfer efficiencies in a subchannel of the type that uses a CP employing CCWs. FIG. 4 provides a block diagram of the improved data processing system of this invention. CPC 20 is shown interconnected with a CPC main storage memory 58, which may include storage facility 30 from FIG. 1. CS 32 is shown interconnected through channel path 34 to a peripheral data storage device (PDSD) 60. PDSD 60 includes a PDSD buffer 62, a record formatter 64 and a storage medium 66, which may be magnetic tape or any other suitable data storage medium known in the art.

Figure 6:
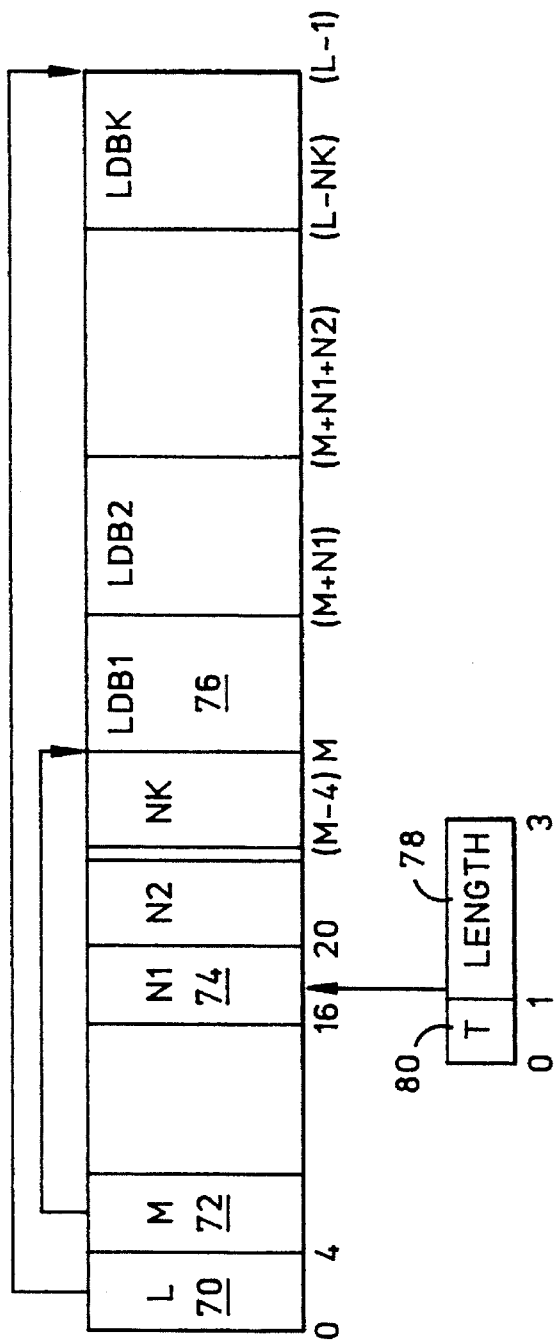
FIG. 6 shows the preferred format for the extended data block (EDB) of this invention.

FIG. 6 shows the extended data block (EDB) data structure of this invention, which contains one or more self-described logical data blocks (LDBs). As used herein, a LDB is at least limited in size to 16 MB by the LDB length field 78. EDB 68 in FIG. 6 contains the following elements:

Extended-Block Length (EBL) field 70: Bytes 0–3 contain EBL field 70 which defines the total length (L) of the EDB in bytes. The 32-bit size of field 70 limits the maximum EDB length to about four GB.

Header Length (HL) field 72: Bytes 4–5 contain HL field 72, which specifies the total length (M) of the extended block header (EBH), which is defined in FIG. 5. The EBH consists of bytes 0–(M−1) of the EDB. The EBH is considered parameter data for the purposes of reporting invalid length and field values. The two least-significant-bits of field 72 must contain zeros, which limits M to multiples of four bytes. The EBH length M must also be no less than 20, which forces the presence of at least one LDB descriptor 74 in EBH, and must be no more than 64 kB because of the two-byte HL field length.

Header Preamble Length (HPL) field 77: Byte 6 is HPL field 77, which defines the length of the EBH up to the beginning of the LDB list is set to 16 in the preferred embodiment.

Read-Block Pad Length field 79: Bytes 9–11 define the read-block pad length. When an EDB is transferred responsive to a read command and the pad short-block control in the PDSD control field is set, the contents of the read-block-length field in the PDSD control field are stored in field 79. When the pad short-block control in the PDSD field is not set, field 79 is set to zero. Field 79 must be set to zero on a write command. When field 79 is non-zero in an EDB transferred by a read command, any LDB in the EDB that has a block length less than field 79 is padded with zeros to bring its length up to the read-block pad length specified in field 79. The block length 78 (FIG. 6) specified in the associated LDB descriptor is not modified as a result of this padding.

LDB list: Bytes 16 through M−1 contain one or more four-byte LDB descriptors that describe the LDBs included in the EDB. The LDB descriptors are exemplified in FIGS. 5 and 6 by N1 descriptor 74. The LDB list is ordered to reflect the order of the LDBs on PDSD medium 66 in the direction of motion. The LDB descriptors in a list may be for LDBs containing data or LDBs containing marks or they may be null block descriptors. The number of LDB descriptors is limited to 16,379 by the length of HL field 72. Null block descriptors are used only to pad the length of this LDB list and are logically removed from the list before application of the list to parse an EDB. N1 descriptor 74 is associated with LDB1 76. The length of LDB1 76 is specified by the LDB length field 78 in the three least significant bytes of N1 descriptor 74. The length of LDB1 76 is determined by the greater of the associated length field 78 and read-block pad-length field 79. Mark LDBs are not allocated any space for LDB data. End-of-data marks are not allowed in an EDB transfer by a write command. Mark LDBs are allowed in an EDB transferred by a read command only when the read-extended mark-enable control flag of the PDSD control field is set.

LDB data fields: Bytes M−(L−1) contain one or more LDBs as specified by the LDB descriptors in EBH bytes 16−(M−1). The last byte of any LDB (including pad bytes, if any) is immediately followed by the first byte of the next LDB, if any. Each LDB is represented in a format that is specified by the block-format field T of the block descriptor associated with the LDB. For instance, T field 80 at byte zero in N1 descriptor 74 specifies the format of LDB1 data field 76.

Although not so defined in this embodiment, the block descriptor field 74 of this invention can be extended to permit transfer of self-formatted LDBs within the EDB. In such case, the block type for a self-describing LDB could be defined and specified in T field 80. The associated EDB data could contain an embedded header definition for the LDB format. Additional LDB header controls or perhaps the PDSD control field could regulate how CS 32 operates with the formatted data. This capability is useful only if the PDSD must be informed of an internal LDB format. The size of LDB length field 78 limits LDB length to about 16 MB. The LDB length is always known when block descriptor 74 is present in the EDB but it may be unknown when the block descriptor is present in a block sense command.

For example, a LDB data-compression structure could be specified with a self-describing header field followed by data compressed according to some algorithm. The header could include the identity of the algorithm as well as other information needed to process the compressed data. Assuming that data is already compressed when written, CS 32 may have the option of transferring the data compressed or decompressed when read. A read control could be defined to specify whether the data should be returned compressed as stored or following decompression by CS 32.

The Preferred EDB Transfer Procedure Of This Invention

Figure 5:
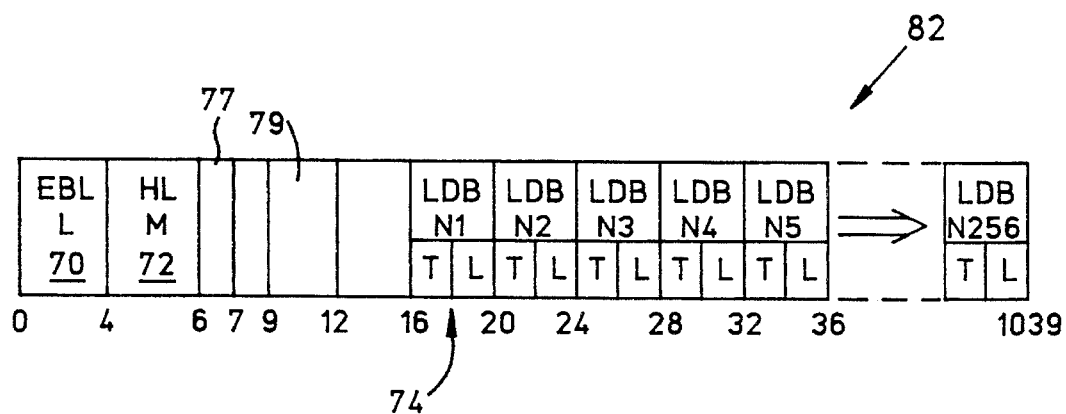
FIG. 5 shows the preferred format for the extended block header (EBH) of this invention.

In operation, referring to FIG. 4, the EBH 82 of FIG. 5 is assembled and stored at location 82 in CPC memory 58 responsive to a TC for moving data from CPC 20 to PDSD 60. The LDBs, exemplified by LDB1 stored at the location 84 and LDBn stored at the location 86, are also stored in CPC memory 58. Accordingly, after I/O start, CS 32 executes a CP consisting of a list of CCWs that fetch and transfer an EDB embracing EBH 82 followed by a series of LDBs exemplified by LDBs 84 and 86.

For TCs that transfer data from PDSD 60 to CPC 20, PDSD buffer 62 performs a very similar function. EBH 82 is assembled and stored in PDSD buffer 62 under local microcode control responsive to the CCWs received from CPC 20. An EDB is then transferred over channel path 34 from PDSD buffer 62 to CPC 20. Suitable local PDSD microcode control means may be included in record formatter 64 (FIG. 4).

The CP may specify a different number of data bytes than are implicitly specified in CS 32 for a given TC. If the CP specifies a number of bytes, only the lesser of the two differing specifications are transferred. The number of bytes that are transferred is determined as follows:

Write Command: PDSD 60 normally attempts to transfer data bytes until told that the data transfer is completed by the ending status operation.

Write-Extended Write Command: PDSD 60 normally attempts to transfer the number (L) of data bytes indicated by the EDB length field 70 in EBH 82 (FIG. 5). If the ending status reports a unit exception, PDSD 60 may have transferred fewer than (L) bytes. In such case, the first byte not accepted by the control unit is forced to be the first byte of the first LDB that is not transferred to ensure that an integral number of LDBs in the EDB are transferred. Any mark LDBs between the last LDB accepted and the first LDB not accepted are also not accepted. If there is nothing but mark LDBs preceding the first LDB not accepted, then AM 21 may not use the WRTE command to transfer the mark LDBs.

Variable-Length Read-Type TCs: PDSD 60 normally attempts to transfer the number of bytes associated with the LDB or EDB being transferred. The following discussion describes the data transfer operation for these TCs.

Channel Truncation: When channel path 34 indicates data transfer completion before the entire LDB is transferred by a TC that reads a single LDB not in an EDB and the unit-check status is not indicated for some other reason, CS 32 is presented with a normal ending status after verifying any checking-block codes (CBCs) for the transferred data. Any remaining data in the LDB are not transferred and PDSD medium 66 is positioned beyond the LDB last accessed. When channel path 34 indicates data transfer completion by a TC that writes a LDB not in an EDB, CS 32 is presented with normal ending status if unit-check status is not indicated for some other reason. When channel path 34 indicates data transfer completion on an EDB command before the entire EDB is transferred, CS 32 is presented with unit-check status and no action is taken.

PDSD Control Unit Truncation and Padding: PDSD 60 may truncate or pad LDBs that are transferred in an EDB by a read command as follows: (a) If truncation occurs as a result of the truncate long-block control in the PDSD control field, PDSD 60 verifies any CBCs for the data that is included and adjusts block length field 78 in the associated LDB descriptor to match the LDB length following truncation. (b) If padding occurs because of the pad short-block control in the PDSD control field, PDSD 60 places the read block-length control from the PDSD control field in the read-block pad-length field 79 of EBH 82 and adds enough zero bytes following the LDB data to bring the LDB length up to the required read-block-length value. The block length 78 in the associated LDB descriptor is not modified. PDSD 60 may truncate, on an LDB boundary, an EDB transfer by a WRTE command when the ending status indicates a unit exception.

Write Block Lengths: Constraints on data transfer lengths imposed by PDSD 60 in write-type TCs are specified in the appropriate PDSD control field (not shown). These limits specify the length requirements for both LDBs and EDBs and are communicated to CPC responsive to the RDC command discussed below. PDSD 60 may truncate an EDB even when these constraints are not violated if the ending status indicates a unit exception.

Read Block Lengths: Constraints on data transfer lengths imposed by the application program on read-type TCs are specified by the "Mode Set" command (not shown) or by default in the appropriate PDSD control field. CS 32 determines how many LDBs are transferred in an EDB subject to these limitations. When a RDFE command is executed, the number of LDBs included in the EDB is limited by the following controls in the PDSD control field: (a) read extended-block length, (b) read block-header length, (c) read logical-block count, and (d) read-extended mark enable. These controls are next discussed.

Read Extended-Block Length: If, after any truncation or padding of a LDB whose length does not match the read-block-length control in the device-control field, the addition of the first LDB to the EDB causes the read-extended-block-length control to be exceeded, the LDB is truncated to satisfy the read-extended-block-length control and the LDB length field 78 in the associated LDB descriptor is set equal to the size of the LDB after truncation.

After any truncation or padding of a LDB whose length does not match the read-block-length control in the PDSD control field, if the addition of any LDB after the first LDB in the EDB would cause the read-extended-block-length control to be exceeded, the LDB is not included in the current EDB.

Read Block-Header Length: If the addition of a LDB would cause the read block-header length control (when non-zero) to be exceeded, the LDB is not included in the EDB and no additional LDB are considered for inclusion in the current EDB. If the read block-header length control in the PDSD control field is non-zero, null block descriptors are added to the LDB list of the EDB as necessary to make the length 70 of the EBH match the read blockheader length control. If the read block-header length control in the PDSD control field is zero, the length control of the LDB list field is determined by the number of block descriptors required to describe the LDBs in the EDB.

Read Logical-Block Count: If the addition of a LDB could cause the read logical-block count control (when non-zero) to be exceeded, the LDB is not included in the EDB and no additional LDBs are considered for inclusion in the current EDB.

Read-Extended Mark Enable: If the read-extended mark enable control is zero, mark LDBs are not included in the EDB. If the first LDB to be included in an EDB is a mark LDB, unit-exception or unit-check status is presented, depending on whether the mark LDB is a tape mark or some other mark, and no data is transferred. If the mark LDB is not the first LDB to be considered for the EDB the mark LDB is not included in the EDB and no additional LDBs are considered for inclusion in the current EDB.

If the read-extended mark enable control is one, mark LDBs may be included in an EDB if no other constraint precludes such LDB addition.

If a LDB is included in an EDB which causes the presentation of unit-check status as a result of either the indicate short-block or indicate long-block controls in the PDSD control field, the LDB that causes the unit-check presentation is forced to be the last LDB included in the EDB. When unit check is presented for this case, the medium 66 is positioned beyond the last LDB included in the EDB (logically just after for a forward command and logically just before for a backward command).

A WRTE command must transfer a minimum of twenty bytes to be valid. Consequently, the PDSD control unit may request up to twenty bytes prior to using EBL 70 to determine the remaining number of bytes to be transferred.

If a WRTE command is nullified, although the medium positioning is restored to the position in effect before the command, the effects the nullified command had on the medium are not reversed. Some of the LDBs transferred by the nullified command may have been written or partially written to the medium. If no additional action is taken by the application program to reverse this condition, the medium formatting at the medium position in effect upon the beginning of the nullified command is either indeterminate or is modified to indicate an end of data mark (if supported by the tape format).

The Read Device Characteristics (RDC) Command

Figure 11:
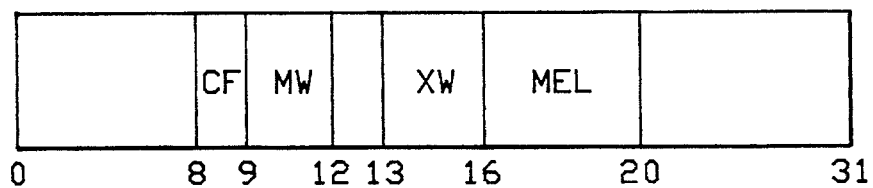
FIG. 11 shows the preferred format for the device characteristics signal (DCS) of this invention.

The Read Device Characteristics (RDC) command allows AM 21 in CPC 20 to obtain the following information from PDSD 60 by means of a device characteristics signal (DCS) having the preferred format shown in FIG. 11:

Command Flags (CF) Field: Byte 8 provides the following command flags: Read Forward Extended Flag: When bit 2 is one, the PDSD supports the RDFE command.

Write Extended Flag: When bit 4 is one, the PDSD supports the WRTE command.

Minimum-Write-Block Length (MW) Field: Bytes 9–11 must be greater than zero and specifies the minimum length, in bytes, of a LDB that can be successfully transferred to the PDSD 60 by a Write or WRTE command.

Maximum-Write-Block Length (XW) Field: Bytes 13–15 specify the maximum length, in bytes, of a LDB that can be successfully transferred to PDSD 60 by a Write or WRTE command. A value of zero indicates that PDSD 60 does not limit the LDB length.

Maximum-Extended-Block Length (MEL) Field: Bytes 16–19 specify the maximum length, in bytes, of an EDB that can be successfully transferred by PDSD 60 for a WRTE or RDTE command.

The Write-Extended (WRTE) Transfer Command

Figure 7:
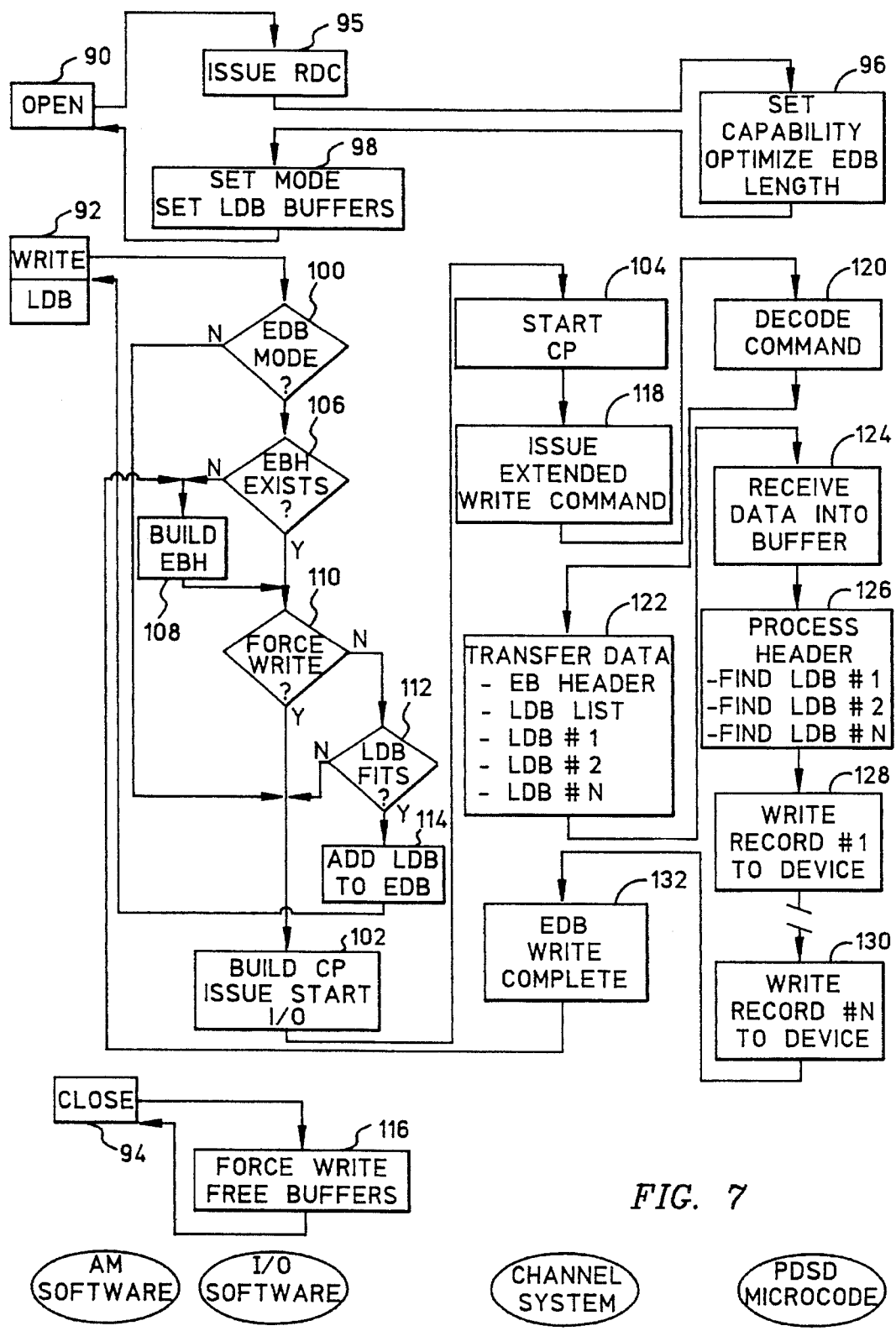
FIG. 7 is a flow chart of the EDB write procedure of this invention.

FIG. 7 provides a block diagram showing the EDB write process of this invention implemented in the WRTE command discussed below. FIG. 7 is organized to show the procedures occurring within the AM software, the I/O software, the channel system and the PDSD microcode. The AM software functions for each LDB include the open function 90, the write function 92 and the close function 94.

Open function 90 first issues a RDC command from CPC 20 to PDSD 60 at step 95. The PDSD microcode then initiates procedure 96, which sets the capability description for the PDSD and optimizes the EDB length specification. These values are then returned to the I/O software in CPC 20 at step 98. In step 98, the I/O software issues a "set mode" command responsive to the PDSD specifications returned from step 96 and sets the LDB buffers in CPC storage 30. Following step 98, the AM software returns, ending open procedure 90.

Write procedure 92 first initiates test 100 to determine whether the LDB is to be written in the EDB mode. If not, the I/O software proceeds to step 102 and builds the CP for the LDB without incorporating any of the features of this invention. Step 102 also issues the "start I/O" instruction to the channel system, which then starts the CP at step 104. If the LDB is to be written in the EDB mode, the I/O software next tests for the presence of an EDB header (EBH) at step 106. If there is no EBH, the software builds one at step 108 and returns to step 110, which tests for the presence of a "forced write" command. If no forced write is requested, the LDB is then tested at step 112 to see if it fits within the remaining space allocated to the present EDB. If a forced write is specified at test 110, then step 102 is immediately executed to build the CP and start I/O. If the LDB overflows the available EDB space, step 102 is also immediately executed. However, ff test 112 finds adequate space in EDB, the LDB is accumulated in the present EDB at step 114 and a return is issued, finishing write procedure 92 for one LDB.

The channel system executes the CP at step 104, which first issues the WRTE transfer command at step 118. The WRTE command is transferred to PDSD 60 where the microcode decodes the command at step 120. Once decoded, control is returned to the channel system, which then transfers the data making up the EDB, which includes the EBH and the LDB list at step 122. These data are transferred to PDSD 60 and received into buffer at step 124. The PDSD processes the header to locate the various LDBs at step 126. Each LDB is parsed into records and written to the storage device in a series of steps starting at 128 and ending at 130. Following step 130, wherein the final record number N is written, control is returned to the channel system with an indication that the EDB write is complete at step 132. The channel system then returns control to the I/O software and proceeds to step 108 where a new EDB header is built for the next EDB.

Close procedure 94 merely forces a write at step 116 to free the buffers occupied by write procedure 92 and then returns.

The WRTE command allows the program to combine multiple LDBs into a single EDB for transfer to the PDSD controller. LDBs that are written by a WRTE command maintain their independent identity on the PDSD medium so that they can be subsequently processed by commands that do not transfer EDBs or by EDB commands that do not transfer the same set of LDBs. The WRTE command can be used with both fixed length or variable length LDBs. Additionally, the data need not be stored in contiguous logical addresses in a CPC storage if the program uses data-chaining to transfer the non-contiguous blocks of storage associated with the EDB. The program should not exceed the maximum-write-block-length or maximum-extended-block-length limitations indicated in the DCS when constructing the EDB. Null block descriptors can be included in the EDB list of an EDB to be transferred by a WRTE command but are essentially ignored by the PDSD control unit and do not affect the formatting of the PDSD medium. In general, the SLI flag should not be set in a CCW associated with a WRTE command. The PDSD control unit will not request more data than is indicated in the EBL field of the EDB.

The WRTE command causes data for one or more LDBs to be transferred from CS 32 to PDSD 60 as an EDB. The first LDB transferred is stored as the next LDB in the forward direction from the current logical PDSD medium position. That is, the first LDB transferred is assigned the same logical-block number as the logical-block number in the channel-block pointer at the initiation of the command. Any subsequent LDBs in the EDB sequentially follow the first LDB and are assigned incrementally increasing logical-block numbers.

If the WRTE command completes successfully, the logical PDSD medium position is set to access the LDB following the last LDB transferred. This means the logical-block number in the channel-block pointer is incremented by the number of LDBs in the EDB.

Unit-check status is presented indicating Command Reject Parameter Error for the following conditions:

HL field 72 in EBH 82 does not contain zeroes in the two low order bits. Read-block pad-length field 79 in EBH is not zero.

A block-format field 80 in one of the LDB descriptors specifies a reserved format for the indicated LDB type.

A block-length field 78 in one of the block descriptors specifies a zero length for a LDB.

EBL field 70 does not equal the sum of HL field 72 plus the sum of all the LDB length fields 78 in the LDB descriptors.

Unit check status is presented indicating Command Reject- Incorrect Parameter Length if the command transfers less than 20 bytes or if the command transfers less than the number of bytes specified in HL field 72. Unit-check status is presented indicating Execution Exception-Buffer Reservation ff it is issued during a buffer reservation and the write-immediate control in the PDSD control field is one.

The Read Forward Extended (RDFE) Transfer Command

Figure 8:
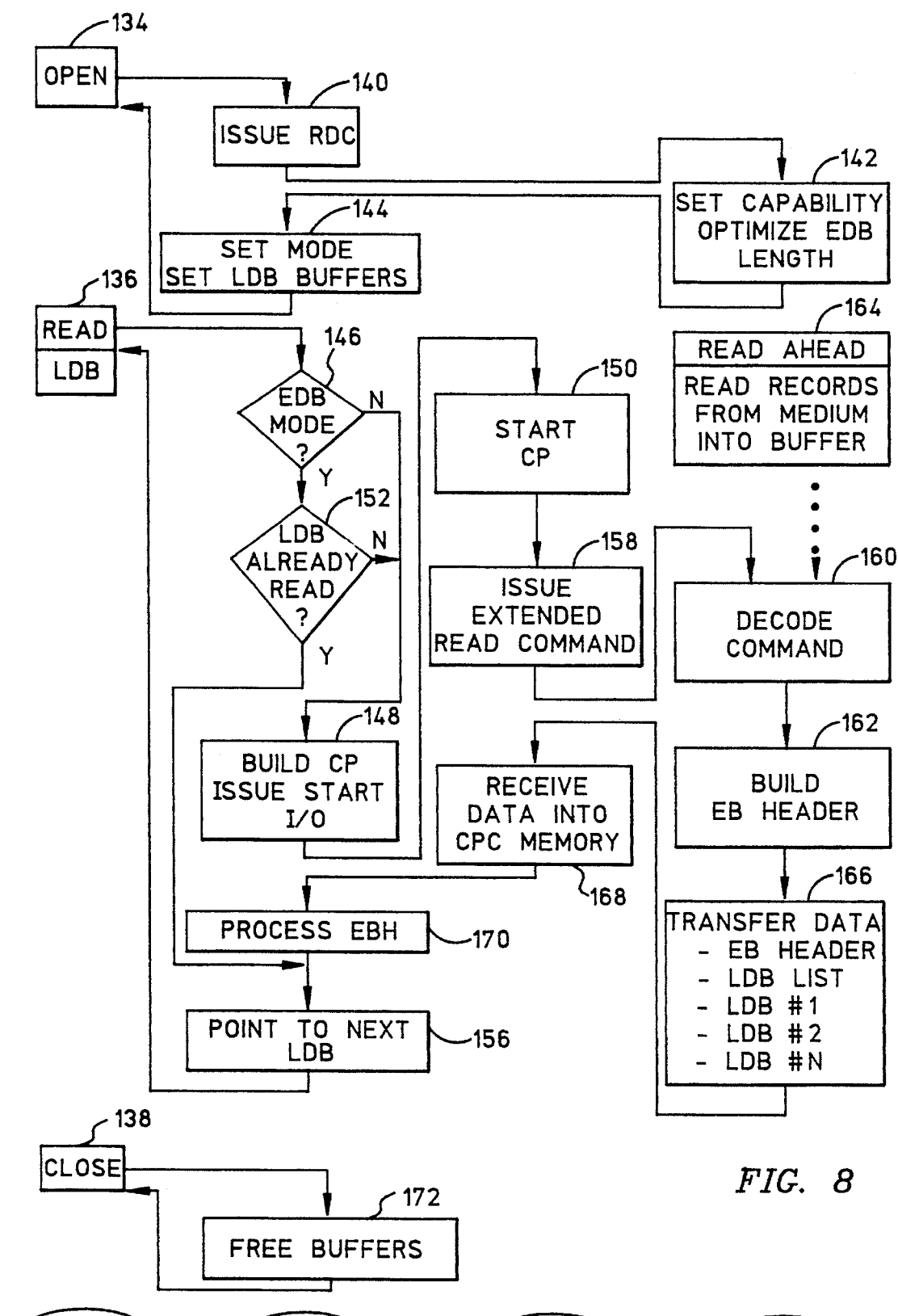
FIG. 8 is a flow chart of the EDB read procedure of this invention.

FIG. 8 provides a block diagram of the EDB read process of this invention as implemented in the RDFE command discussed below. Similarly to FIG. 7, the procedures in FIG. 8 are divided into four regions within the system; the AM software, the I/O software and the channel system contained within CPC 20 and the PDSD microcode contained within PDSD 60. The AM software includes the three procedures shown; the open procedure 134, the read procedure 136 for one LDB and the close procedure 138.

Open procedure 134 first issues a RDC command at step 140 in I/O software. The RDC command is transmitted to PDSD 60. Responsive to the RDC command, the PDSD microcode sets the EDB capabilities and optimizes the EDB length at step 142 and returns these parameters to I/O software at step 144. In step 144, the I/O software executes a "set mode" command and proceeds to set the LDB buffers within CPC main storage facility 30. Once step 144 is complete, the I/O software returns control to AM, completing open procedure 134.

Read procedure 136 first tests the requested LDB to determine if the EDB mode is required at test 146. If the LDB is not to be read as part of an EDB, then step 148 is immediately executed. Step 148 builds a CP and issues a "start I/O" command to the channel system. Following step 148, the channel system then starts execution of the CP at step 150. If the EDB mode is specified at test 146, then test 152 is immediately executed to determine if at least one LDB has already been requested. If an LDB has already been requested, then the requested LDB is returned to satisfy the read request and a step 156 is executed to set a pointer to the next LDB in the present EDB. If not, then step 148 issues a start I/O command to build and execute a CP in EDB mode.

Following execution of the start I/O command in step 148, channel system starts CP execution at step 150. Step 150 immediately issues a RDFE command at step 158, which is transferred to PDSD 60 to be decoded at step 160. Following decode, the PDSD microcode builds the new EBH at step 162 and, incorporating read-ahead data obtained in step 164, executes the transfer data step 166. Step 166 transfers an EDB consisting of the EBH and the LDB list from PDSD 60 to CPC storage 30 at step 168. After the EDB is received into storage 30 at step 168, the I/O software processes the EBH to reorganize the EDB into individual LDBs at step 170. Following completion of step 170, control proceeds to step 156, which sets a pointer to the first LDB in the next EDB and then returns to AM.

Close procedure 138 merely frees the buffers within storage 30 at step 172 and then returns to AM.

The RDFE command allows the AM to request that the PDSD control unit combine multiple LDBs in to a single EDB for transfer to the channel system. The PDSD control unit limits the transfer to an integral number of LDBs, controls the type and size of the LDBs, and reports length-check conditions based on the values of PDSD control field parameters such as Read Extended-Block Length, Read Block-Header Length, Read Logical-Block Count, Read Block Length, Indicate Short Block, Indicate Long Block, Pad Short Block, Truncate Long Block and Read Extended Mark Enable. The RDFE command can be used with both fixed length or variable length LDBs.

If a contiguous CPC storage block (in virtual or real address space) is associated with the EDB, the size of the CPC storage block should be at least as large as the read extended-block length specified in the PDSD control field. If the RDFE command completes successfully, the program can use the EBH fields to locate the LDBs within the EDB whether or not the blocks are fixed or variable in length.

If it is desirable to direct the LDBs to non-contiguous storage blocks (in virtual or real address space), the program can specify the values of the following controls to be: Read Block-Header Length=Header Buffer Size, Read Logical Block Count=Number of Buffers, Read Block Length= Buffer Size, Pad Short Block=1 and Truncate Long Block=1.

In such case, the storage areas required for the buffers becomes fixed length such that the channel program can be constructed to distribute different LDBs to different buffers. For fixed length LDBs, the program should specify the "indicate long-block" and "indicate short-block" controls. For variable length logical block, the programmer may want to specify the "indicate long-block" controls to detect truncation when it occurs.

In general, the SLI flag can be set with safety in a read-type command that transfers EDBs provided that the program sets the "indicate-long-block" and "indicate-short-block" controls as required for the desired checking and determines the number and lengths of LDBs transferred from the block list in the EBH. Multiple EDB TCs can be command-chained together provided that the CPC storage locations associated with each such TC are non-overlapping.

The length of the EDB is not subject to the limitations imposed on record lengths or block lengths recorded in the storage label field because the EDB exists only as a mechanism to transfer LDBs between CPC and the PDSD control unit and is not written on the PDSD medium as a single block.

The RDFE command causes data for one or more LDBs to be transferred from the PDSD control unit to the channel in an EDB. The first LDB transferred is in the next LDB the forward direction from the current logical PDSD medium position. That is, the first LDB transferred has the same logical-block number as the logical-block number in the channel-block pointer at the initiation of the command. Any subsequent LDBs in the EDB sequentially follow the first LDB because they have incrementally increasing logical-block numbers. The data bytes in the LDBs are transferred in the same order that they were received when the LDBs were written, with first byte first and last byte last.

If the RDFE command completes successfully, the logical PDSD medium position is set to access the LDB following the last LDB transferred. This means that the logical-block number in the channel-block pointer is incremented by the number of LDBs in the EDB.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In a data processing system having a central processing complex (CPC) with a channel subsystem (CS) for connecting to one or more peripheral data storage devices (PDSDs) each having formatting means for storing logical data blocks (LDBs) in any predetermined record format, said CPC also having input/output (I/O) means for creating a channel program (CP) to transfer data between said CPC and any said PDSD, said CP containing one or more channel control words (CCWs) including at least one transfer command (TC), each said CCW having a logical block length field of $k=\log_2 n$ bits, wherein k and n are non-zero positive integers and wherein each said LDB includes no more than (n−1) bytes, a data object comprising:

a plurality of said LDBs stored in a memory of the data processing system; and an extended block header (EBH) stored in the memory, said EBH having a header length field for specifying to a TC the length of said EBH, having a data object length field for specifying to a TC the length of said data object, and having one or more block descriptor fields, each for specifying to a TC a length of a respective LDB of said plurality of LDBs.

2. The data object of claim 1, wherein an LDB of said plurality of LDBs contains data.

3. The data object of claim 1, wherein an LDB of said plurality of LDBs contains marks.

4. The data object of claim 1, wherein a block descriptor field of said one or more block descriptor fields is a null lock descriptor.

5. In a data processing system having a central processing complex (CPC) with a channel subsystem (CS) for connecting to one or more peripheral data storage devices (PDSDs) each having formatting means for storing logical data blocks (LDBs) in any predetermined record format, said CPC also having input/output (I/O) means for creating a channel program (CP) to transfer data between said CPC and any said PDSD, said CP containing one or more channel control words (CCWs) including at least one transfer command (TC), each said CCW having a logical block length field of $k=\log_2 n$ bits, wherein k and n are non-zero positive integers and wherein each said LDB includes no more than (n−1) bytes, a data object comprising:

a plurality of said LDBs stored in a buffer of said PDSD; and an extended block header (EBH) stored in the buffer, said EBH having a header length field for specifying to a TC the length of said EBH, having a data object length field for specifying to a TC the length of said data object, and having one or more block descriptor fields, each for specifying to a TC a length of a respective LDB of said plurality of LDBs.

6. The data object of claim 5, wherein an LDB of said plurality of LDBs contains data.

7. The data object of claim 5, wherein an LDB of said plurality of LDBs contains marks.

8. The data object of claim 5, wherein a block descriptor field of said one or more block descriptor fields is a null lock descriptor.

9. The data object of claim 5, wherein said block descriptor fields are ordered corresponding to an order in which said plurality of LDBs is stored on a storage medium of said PDSD.

* * * * *